US006185543B1

(12) United States Patent
Galperin et al.

(10) Patent No.: US 6,185,543 B1
(45) Date of Patent: Feb. 6, 2001

(54) METHOD AND APPARATUS FOR DETERMINING LOAN PREPAYMENT SCORES

(75) Inventors: Yuri Galperin, Reston, VA (US); Vladimir Fishman, Farmington, CT (US); William A. Eginton, Philomont, VA (US); Charles L. Jones, III, Marblehead, MA (US)

(73) Assignee: MarketSwitch Corp., Sterling, VA (US)

( * ) Notice: Under 35 U.S.C. 154(b), the term of this patent shall be extended for 0 days.

(21) Appl. No.: 09/078,867

(22) Filed: May 15, 1998

(51) Int. Cl.⁷ ........................................... G06F 17/60
(52) U.S. Cl. ..................................................... 705/38
(58) Field of Search .................... 705/38, 35, 36, 705/7, 1

(56) References Cited

U.S. PATENT DOCUMENTS

| 3,316,395 | | 4/1967 | Lavin ................................. 235/185 |
| 4,774,664 | | 9/1988 | Campbell et al. ................... 364/408 |
| 5,148,365 | * | 9/1992 | Dembo ................................. 705/36 |
| 5,239,462 | * | 8/1993 | Jones et al. ........................... 705/38 |
| 5,611,052 | * | 3/1997 | Dykstra et al. ....................... 705/38 |
| 5,696,907 | * | 12/1997 | Tom ..................................... 705/38 |
| 5,699,527 | * | 12/1997 | Davidson ............................. 705/38 |
| 5,870,721 | * | 2/1999 | Norris .................................. 705/38 |
| 5,878,403 | * | 3/1999 | DeFrancesco et al. .............. 705/38 |
| 5,884,287 | * | 3/1999 | Edesess ............................... 705/36 |
| 5,940,812 | * | 8/1999 | Tengel et al. ........................ 705/38 |

FOREIGN PATENT DOCUMENTS

WO99/46710 * 9/1999 (WO).

OTHER PUBLICATIONS

"Shareholders Sue Green Tree Financial," Dated Dec. 4, 1997, Retrieved on Mar. 21, 2000 from the Internet <URL: http://www.wcco.com/news/stories/news–971204–092238.html>.*

"Green Tree Sold to Conseco," Dated Apr. 7, 1998, Retrieved on Mar. 21, 2000 from the Internet <URL: http://www.chaskaherald.com/news/stories/new–980407–113102.html>.*

"Green Tree Investors May Go To Court," Dated Mar. 4, 1998, Retrieved on Mar. 21, 2000 from Internet <URL: http://www.channel4000.com/news/stories/news–980304–120038.html>.*

(List continued on next page.)

Primary Examiner—Tod R. Swann
Assistant Examiner—Susanna Meinecke-Díaz
(74) Attorney, Agent, or Firm—Roberts Abokhair & Mardula LLC

(57) ABSTRACT

A method and apparatus for determining the prepayment propensity of borrowers. Earlier payment of loans and particularly mortgage loans can lead to losses being suffered by lenders. The present invention analyzes the demographics associated with a particular borrower to determine both the individual and group based prepayment propensity. The history of the borrower, the history of the demographic group to which the borrower belongs, interest rate trends and other factors are then used to calculate a prepayment score that can be used by the lender to determine the propensity of a given borrower to prepay the loan in question. Where prepayment is a significant risk, inducements to the borrower to leave the loan in force can be made or the loan product can be adjusted to reflect the prepayment risk involved. Loan brokers can also be rated based upon the prepayment propensity of those borrowers who are clients of the broker. As with borrowers, a prepayment score can be attributed to a loan broker based upon the prepayment behavior of the brokers clients. This will help lenders assess the success of brokers with whom the lender deals.

14 Claims, 6 Drawing Sheets

OTHER PUBLICATIONS

Cohen, Jackie, "Managing Risk In Mortage Lending," Bank Technology News, vol. 9, No. 3, pp. 1 +, Mar. 1996.*

Bancroft, John, "Advanced Tools for Risk Management," Real Estate Finance Today, vol. 13, No. 9, pp. 2 & 16, Apr. 1996.*

Ratner, Juliana, "GMAC to Sell Risk–Management Advice; Target is 150 Biggest Home Loan Servicers," American Banker, vol. 161, No. 53, p. 16(1), Mar. 1996.*

Risk Monitors, "New GMAC Unit Focuses on Portfolio Risk," PR Newswire, p. 0313DEW026, Mar. 1996.*

"GMAC, JP Morgan Analysts Start Risk Analysis Firm," Mortgage–Backed Securities Letter, vol. 11, No. 13, p. N/A, Mar. 1996.*

Dash, Julekha, "Java on the Street," Software Magazine, vol. 17, No. 11, p. 27, Oct. 1997.*

"GMAC to Sell Risk," American Banker, vol. CLXI, No. 53, p. 16, Mar. 1996.*

Kulkosky, Edward, "Credit Scoring Appeal Transcends Underwriting," American Banker, vol. 161, No. 93, p. 8(1), May 1996.*

Taylor, Marshall, "Loan–Level Pricing Draws Interest From Investors," Real Estate Finance Today, vol. 14, No. 14, pp. 10 & 20, Jul. 1997.*

Anonymous, "RF/Spectrum to Offer Score," National Mortgage News, vol. 21, No. 36, p. 40, Jun. 1997.*

Bancroft, John, "Tools Help Managers With Risk Management," Real Estate Finance Today, vol. 14, No. 11, pp. 6 & 12, May 1997.*

Wahl, Martin, "The Stampede to Subprime," Mortgage Banking, vol. 58, pp. 26–27 +, Oct. 1997.*

Healy, Thomas J., "The New Science of Borrower Behavior," Mortgage Banking, vol. 58, No. 5, pp. 26–35, Feb. 1998.*

Steele, Georgia, "Fair, Isaac Seeks Mortgage Tech Opportunities," National Mortgage News, vol. 22, No. 26, p. 34, Mar. 1998.*

"Credit Risk Management Report Briefs," Credit Risk Management Report, vol. 6, No. 7, Apr. 1996.*

Barone, R. P., "The Integrated Approach to Branch Service Delivery," American Banker, vol. 156, No. 150, p. 6 [online], Aug. 1991 [retrieved on Jul. 26, 1999]. Retrieved from Dialog.*

"Groups Demand Government Action On Online Marketing To Children," American Marketplace [online], Apr. 1996 [retrieved on Jul. 26, 1999]. Retrieved from Dialog.*

Davis, L., "Safety in numbers," Business North Carolina, vol. 15, No. 9, p. 24 [online], Sep. 1995 [retrieved on Jul. 26, 1999]. Retrieved from Dialog.*

"A New Rival for Wall St. Prepay Models," Mortgage–Backed Securities Letter, American Banker–Bond Buyers, vol. 14, No. 12 [online], Mar. 1999 [retrieved on Jul. 26, 1999]. Retrieved from Dialog.*

"Taking Prepay Models To A New Level," Mortgage Marketplace, American Banker–Bond Buyer, vol. 21, No. 161 [online], Apr. 1998 [retrieved on Jul. 26, 1999]. Retrieved from Dialog.*

Frank, J. N., "Scoring Takes on A New Meaning," Credit Card Management, p. 155 [online ], Sep. 1996 [retrieved on Jul. 26, 1999]. Retrieved from Dialog.*

Abraham, S. W., "The New View In Mortgage Prepayments: Insight From Analysis At The Loan–By–Loan Level," Jun. 1997 [retrieved on Jul. 26, 1999]. Retrieved from Proquest.*

Tang et al., "An analysis of the Ex Ante probabilities of mortgage prepayment and default," Real Estate Economics, vol. 26, Issue 4, p. 651 [online], Dec. 1998 [retrieved on Jul. 26, 1999 from Proquest].*

Novack, Janet, Forbes Magazine, Dec. 18, 1995 vol. 156, Issue 14, p. 96 ISSN: 00156914.

Mortgage Bankers Association of America, Nov. 1994, vol. 55, Issue 2, p. 94, ISSN: 07300212.

* cited by examiner

METHOD AND APPARATUS FOR DETERMINING LOAN PREPAYMENT SCORES

FIELD OF THE INVENTION

This invention relates generally to receiving applications for and processing of mortgage loans and other debt products. More specifically this invention provides a method and apparatus to assess the prepayment propensity of a borrower in the form of a prepayment "score" to enable assessment of the value of the mortgage or other debt instrument for an investor and to allow the creation of customized loan products keyed to the financial behavior of the consumer-borrower.

BACKGROUND OF THE INVENTION

By way of introductory example, consider that most common of debt instruments, the consumer mortgage. The value of a mortgage depends in large part on the duration of the mortgage. At the inception of the mortgage there are broker fees and various other settlement costs that are charged to the lender. When a mortgage extends for the term of many years, there is an opportunity for the lender to recoup costs of putting a mortgage in place for a given consumer and to make profit on that mortgage. This is particularly important for all business organizations that lend money, but it is particularly important for those mortgage financing organizations which have stockholders and other investors.

When a mortgage loan is paid off early due to refinancing, depending upon how early in the term, there is the possibility that the lending institution can actually take a loss on the particular mortgage. The rate of prepayment depends on a number of objective factors. For example, during times of decreasing mortgage rates, on average, more consumers refinance their home loans than would otherwise occur, in order to obtain a lower monthly payment. However, for a given macroeconomic environment and other measurable, objective factors, each consumer evidences an individual propensity to prepay a loan. This prepayment propensity reflects the consumer's demographic and other objective attributes. A system that can assess such individual prepayment behavior by a consumer in advance of the loan will lead to more profitable loans being made, and hence the enhanced availability of funds for loans to more consumer-borrowers. The present invention therefore may be applied without limitation to a) the pricing of mortgages and other debt instruments, b) the valuation of existing portfolios of debt instruments, and c) the risk management of institutions that hold debt instruments.

A further element of the present invention is the monitoring and scoring of mortgage brokers. Mortgage brokers deal with both consumer-borrowers and lenders-clients. In order to generate brokerage fees, it is possible for a broker to encourage its consumer-borrowers to refinance their mortgages frequently and prematurely. When this occurs, the mortgage broker generates a fee. However, early prepayment of the prior mortgage instrument can result in a loss for the lender. Thus the present invention also has the capability to score mortgage broker prepayment behavior.

The behavior of a broker is sometimes not all heinous. Sometimes a consumer, who is particularly attuned to the rise and fall of interest rates, will simply be the one who changes mortgage instruments more frequently than the average consumer. The broker who is scored based upon the prepayment behavior of the consumers that the broker brings to lenders, would like to know the prepayment propensity for the given consumer. This would be useful so that the mortgage broker can optimize the broker's relationship with its lender-clients by only bringing consumer-borrowers who have a low prepayment propensity.

Therefore, lenders and brokers badly need the ability to better measure prepayment behavior in advance of incurring marketing or underwriting charges; these expenses are too great to absorb blindly on behalf of consumers with poor prepayment propensities. Indeed, a beneficial use of the invention would be in managing the initial marketing effort itself. For example, only those customers who can be shown to score favorably for prepayment behavior might receive a solicitation for a mortgage product A. Consumers who are revealed to represent a substantial prepayment risk may be offered a more suitable mortgage product B, reflecting the increased risk. In this way, enhanced customer segmentation and product design initiatives converge to benefit consumers and their sources of debt financing.

To understand the potential impact of a national prepayment scoring standard, as manifested in the present invention, one need look no farther than the existing default risk scoring standard, owned and distributed by Fair, Isaac and Company, Inc. (Fair Isaac) for over 30 years. By establishing a standard methodology for scoring borrower default risk, and broadly disseminating it, Fair Isaac dramatically enhanced mortgage lender insight into expected loan dynamics. In finance, enhanced insight is synonymous with enhanced information. Enhanced information implies reduced risk for the lender. Finally, reduced lender risk profiles produce lower costs of capital. In other words, because Fair Isaac standardized successfully a fungible measurement of default risk, more money is available for consumers to borrow, at better and cheaper interest rates. The market is more efficient than before and everyone benefits.

To further qualifying the timeliness of the invention, please refer to exhibit 1, "Green Tree chief returns $23 million . . . "The Wall Street Journal, March, 1998. This story highlights the industry wide uncertainty surrounding prepayment speeds in consumer debt portfolios. One industry leading company, Green Tree Financial, "has been hit hard the past year by escalating loan losses in the painful recognition that its accounting has been too aggressive. Also, an unexpected wave of loan prepayments hit the industry, as borrowers sought lower interest rates, indicating working-class consumers were not as unsophisticated as lenders had believed." Stated plainly, Green Tree overstated prior year earnings significantly, exercising its option under GAAP accounting to roll forward and capture in advance projected lending profits, even though those very profits were merely estimated based in part on arbitrary prepayment assumptions. In large measure because Green Tree badly miscalculated these prepayments speed assumptions, in 1997 the company was forced to charge off $390 million of 1996 reported profit. In 1998 the company was sold off to Conseco.

Earlier disclosures in the area of prepayment scoring in a lending context are limited or nonexistent. U.S. Pat. No. 5,696,907, entitled "System and Method for Performing Risk and Credit Analysis of Financial Service Applications," issued to Tom. The Tom patent discloses using a neural network to mimic a loan officer's underwriting decision making. The method of the Tom patent is based on a non-iterative regression process that produces an approval criterion that is useful in preparing new or modified underwriting guidelines to increase profitability and minimize losses for a future portfolio of loans. A prepayment observation is used in the neural net as a negative flag, but no prepayment scoring system is utilized in the Tom patent.

In view of the prior art, there is a clear need for measuring and predicting a consumer's prepayment propensity, as well as a clear and strong need for a method and apparatus to produce such a measuring and predictive parameter.

SUMMARY OF THE INVENTION

The system and method of the present invention generally works in the following manner: the service bureau or broker will electronically capture individual loan applications from consumers. Those loan applications will be sent to lenders for evaluation. The lender, using the present invention submits the loan application for review and analysis. The loan application will be reviewed by the present invention according to a sophisticated economic and customer behavior model, which will score the prepayment behavior of candidate borrowers. The score for these borrowers, which is an index of their prepayment propensity, will be electronically returned to the lender. The lender will in turn use the prepayment score and calibrate an appropriate mortgage price including the setting of interest rates, fees, broker commissions, and potentially consumer rewards. Using this consumer scoring technique, a lending institution can seek to contact or contract with those consumers who display a low propensity to prepay.

The advanced scoring of customer prepayment propensities materially improves the lender's to risk profile as regards new lending customers. This novel insight adds value to the marketing, underwriting, lending, administrative process for first and second mortgages, credit card balance transfers, and asset-backed term loans such as automobile loans. By assisting lenders in their efforts to segment customers according to this crucial behavior metric, waste and excess costs are driven from the lending economy. More money is thus available, more cheaply, for more people.

To the borrower, this system offers several advantages. First, more favorable loan terms can be made to those consumers who exhibit a beneficial borrowing behavior, i.e., borrowers who are not likely to prepay their loans but instead maintain their loans for a profitable duration. Further, dealing with a stable borrower market results in a more favorable financial environment on for all lenders thereby mitigating the risk of loss and, in the normal course of all efficient markets, passing that financial advantage onto borrowers generally.

Once again, the irrefutable economic relationship between financial risk-taking and expected financial reward informs the environment addressed by the present invention. If lenders reduce their risks-and by extension their costs-through enhanced prepayment scoring, ultimate borrowing costs paid by consumers will decline.

For the loan originator, the system offers several advantages. The loan originator can more efficiently price the particular loan. Further the loan originator can more efficiently select brokers and intermediaries who will select the best borrowers. Further, the system and method of the present invention will lead to more efficient direct and indirect marketing investments by identifying individual consumers and groups of consumers who exhibit the most beneficial borrowing behavior, i.e., a propensity not to prepay financial obligations.

Given that direct marketing costs are exploding as the conventional direct channels (e.g. mail and outbound telemarketing) become saturated, any available efficiency in the direct marketing process is highly desirable. For example, in the marketing of home equity lines of credit (i.e. second mortgages), direct-mail response rates are now, on average, running below 0.3% (i.e. below 3/10ths of one percent). Obviously, some fraction of even this small respondent sample will prove ill-suited, as regards prepayment behavior, for the debt product being marketed. Therefore, the tailoring of specific debt products to consumers of specific prepayment behavior characteristics is essential to the efficient pricing of debt instruments. Lead generation, third-party data acquisition, underwriting, yield spread calculations all directly inform debt instrument profitability, and are all beneficially affected by the present invention.

Finally, in the context of sophisticated asset liability management (ALM), subtle prepayment behavior analysis provides significant benefits to its practitioners. Because ALM, as a primary objective, seeks to minimize destructive asymmetries in asset and liability cash flows, intelligent risk managers will utilize debt contracts of varying expected durations to strengthen their balance sheet. For example, a lender's risk manager may seek multiple classes of debt instrument, reflecting multiple prepayment profiles, in order to assure himself of adequate incoming cash flow to sustain his expected liability cash outflows. In the matching, therefore, of expected cash in- and out-flows, the prudent risk manager utilizes a carefully segmented portfolio of debt instruments scored by prepayment propensities (and other measures) and priced accordingly, to avert liquidity crises.

An additional, equally valuable use of the present invention is in the valuation of existing mortgage or debt instrument blocks of business. This valuation may be required by lender risk managers, auditors, regulators, or investors; it may reflect stakeholder interest in actively managing asset-liability risk, or it may be performed as part of the merger and acquisition appraisal. In all instances, the prepayment scoring system quantifies from a granular perspective upward to a pool, or block perspective, the prepayment speed characteristics of the debt instruments. As we have seen in the Green Tree case, failing to adequately price prepayment risk has enormous balance sheet implications, and typically leads one to grossly over value a portfolio or the enterprise itself.

For auditors, the system of the present invention offers a quantitative measure of prepayment risk thus reducing auditor exposure to "claw-back" write-downs. This situation occurs in the case of issuers that secure these mortgages and, under the generally applied accounting procedures (GAAP) accelerate and capture earnings based on certain prepayment assumptions. If those prepayment assumptions are incorrect, prior year financial statements are incorrect and massive charges are required to reflect lower portfolio earnings.

For banking regulators, the system of the present invention offers the ability to quantify balance sheet risk resulting from expected consumer prepayment behavior. This will allow regulators to more precisely measure and assign minimum bank capital levels.

For credit rating agencies, the ability to score according to an objective, standard methodology prepayment risk provides enormous assistance in rating a lender's creditworthiness. Rating agencies function, effectively, as credit market bellweathers. Lending institutions are dependent on favorable credit ratings in order to float their institutional debt at advantageous rates; rating agencies, as in the case of regulators, evaluate carefully lenders' claims of capital adequacy; the capital (cash reserves) retained by lenders is directly and immediately affected by debt instrument prepayment speeds. This is because, under GAAP accounting rules, lenders are allowed to capture a substantial percentage of the future expected profits for a given contracted debt instrument, and those profits are themselves substantially dependent on the assumed life of the instrument. (In the case of subprime mortgages, for example, profits may double if the mortgage is maintained in force for four years instead of three). If those profits are overstated, they must be reversed, with resultant charges reducing lender capital (capital: paid-in cash investments plus retained profits). Therefore, rating agencies must scrutinize lender portfolio prepayment speed assumptions, because if those assumptions prove false, then the lender will suffer a reduction in capital. Any significant impairment of lender capital necessarily suggests a reduction in its credit rating. Credit rating agencies will be major beneficiaries and users of the present invention.

For investment bankers, the system of present invention establishes a standardized prepayment methodology that allows merger and acquisition advisers to be able to quantitatively measure the balance sheet risk in a target banking or mortgage company. In addition, investment bank usage of the present invention will include its application to debt instrument securitization. Securitization describes the process by which pools of mortgage or other debt instruments are purchased by investment banks—in their capacity as underwriters—and re-sold to institutional and public investors as reconstituted securities. Typically, these securitizations benefit originators of debt, because they realize significant acceleration in realized profits; they also significantly diversify their risks by selling significant aspects of the debt instrument to asset underwriters and others. However, the typical debt instrument securitization proceeds with the originating lender retaining significant prepayment risk; if prepayment speeds accelerate beyond levels assumed in the securitization pricing process, the originating lender is held responsible. Hence the invention, by measuring the expected prepayment behavior and scoring in according to an accepted, industry standard method, will improve the securitization process and render it more efficient. Once again, this will reduce costs for all participants and free up more capital for lower-cost consumer borrowing.

For investors, the method of the present invention provides a way to make investment decisions based upon quantified debt instrument prepayment behavior risk for lending institutions in which investors might want to invest, or to evaluate the relative stability of mortgage securities that are backed by individual debt instruments.

These and other advantages of the present invention are described in reference to the specification that follows.

DETAILED DESCRIPTION OF THE PREFERRED EMBODIMENT

Figure 1:
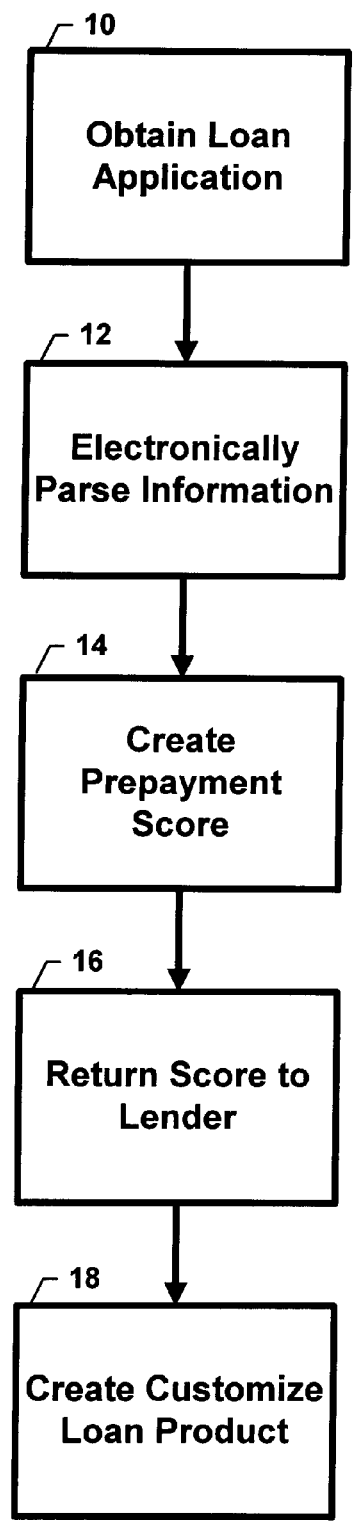
FIG. 1 is an overview of the process of the present invention.

Referring to FIG. 1, an overview of the process of the present invention is shown. The mortgage broker or lending institution first obtains a loan application from a borrower 10. That information is electronically transmitted to the present invention which parses the information 12 of the loan application into various categories that are relevant to the scoring of the potential loan. The loan application contents are parsed based upon the information needs of a sophisticated mathematical model resident in the present invention. A prepayment score is then derived 14 for the particular consumer as a function of the particular loan type being requested, and in further view of the interest rate environment in which the loan is being processed (i.e. rising or falling interest rates). As previously noted this score is an indication of the prepayment propensity of a particular consumer. The prepayment score is then returned to the lender 16. Thereafter the lender can create a customized loan product that rewards favorable prepayment behavior of the consumer 18.

Figure 2:
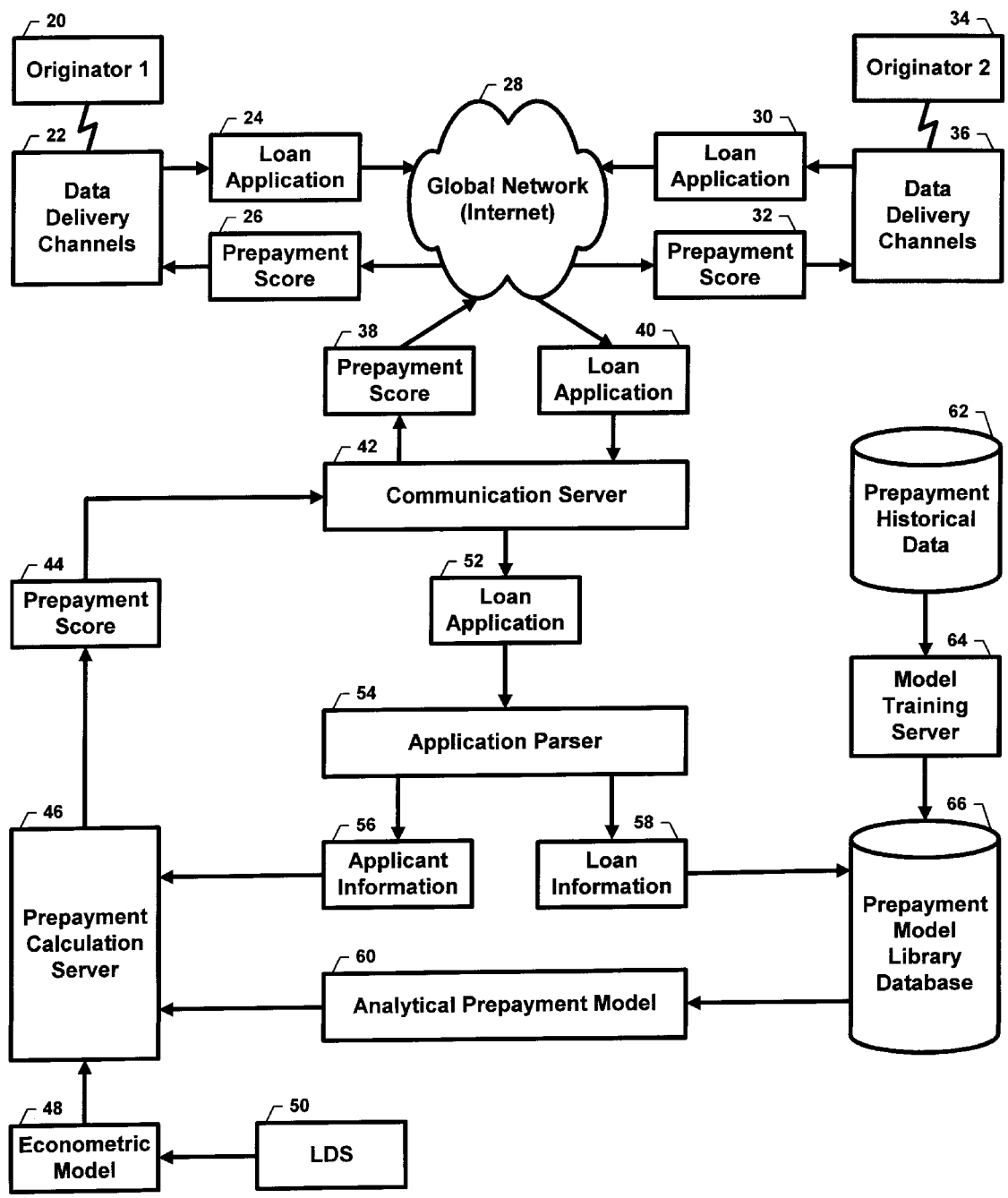
FIG. 2 is a block diagram of the present invention.

Referring to FIG. 2, an overview of the system of the present invention is shown. A loan originator 20 receives the application from a potential consumer. That application is then input to the loan originator's data delivery channels 22. Such data delivery channels 22 are (without limitation) e-mail, fax, Internet, and generally other electronic means. Other loan originators 34 also send their respective consumer applications over their own data delivery channels 36.

The present invention anticipates delivery of loan applications 24 over the Internet 28 or other digital electronic means such as wireless communications methods as well. Electronic loan applications 40 enter the system of the present invention through a communication server 42. The loan information concerning a given consumer is then submitted to an application parser 52. Application parser 52 divides the information into loan information 58 and applicant information 56. Loan information 58 is information that relates to the amount, the term, down payment, loan type, and other information important and relating to the amount of money to be loaned. Applicant information 56 is information such as name, address, Social Security number, and other demographic information concerning the applicant.

Loan information 56 is fed into a prepayment model library database 66. The prepayment model library database 66 comprises information concerning prepayment historical data 62. The results are fed into model training server 64 which processes prepayment historical data 62 of both an individual and demographic groups which in turn provides updates to the prepayment model library database 66. Once loan information 58 is processed by the prepayment model library database 66 an analytical prepayment model 60, which is based upon the loan information 58 is provided to the prepayment calculation server 46. Prepayment calculation server 46 receives additional information from econometric model 48 which establishes the relationship among the wide variety of variables. Econometric model 48 generates interest rate, mortgage rate and other economic parameters that, arrayed in time series, comprise scenarios utilized by the prepayment calculations server. These scenarios are generated from the Low Discrepancy Sequence (LDS) logic, rather than using random number generation. The LDS logic affords significantly higher model accuracy with the same number of scenarios.

Once a prepayment score 44 is derived by prepayment calculation server 46, prepayment score 44 is sent to the communication server 42 and is transmitted over the Internet (or other electronic channels) 28 through the data delivery channels 22 or 36 back to loan originators 20 or 34 who can then either approve, disapprove, or create customized loan product for the consumer.

Prepayment score 38 is calculated based upon the following model. The specific prepayment analysis of the present invention is conceptually shown below. The following variables:

$$A=(a_1, a_2, \ldots, a_n)$$

$$L=(l_1, l_2, \ldots, l_m)$$

are vectors of the applicant's data and loan parameters.

$$E_s(t)=(e_{1s}(t), e_{2s}(t), \ldots, e_{ks}(t)); s=1, \ldots S$$

denotes a set of Low Discrepancy Sequence (LDS)-based scenarios of the econometric parameters, which have been generated by the RTH Linked Index Econometric Model. Thus the model is a set of stochastic differential equations that describe the dynamics and interaction of major macroeconomic indicators, each relevant to the prepayment propensity calculation.

Analytical Prepayment Model $\Re$ which varies with the types of loan applied for, is trained to calculate prepayment value $p_s$ in a given scenario based on the applicant's data (A), loan parameters (L), and econometric parameters (E):

$$p_s(t)=\Re(A,L,E_s(t))$$

Total prepayment, accumulated by the time T in scenario s, can be calculated as:

$$P_s(T) = \prod_i p_s(t_i)$$

Then, total prepayment at time T is given by:

$$P(T) = (1/S)\sum_{s=1}^{S} P_s(T)$$

Finally, the prepayment score is:

$$\text{Score} = \sum_T TP(T)$$

The analytical model that produces the prepayment score may be further informed by additional external behavioral or econometric factors, based on subsequent research, as well as the aforementioned behavioral scoring of mortgage broker behavior.

The present invention may also be represented in an alternative embodiment in the form of the credit engineering workstation (CEW). This CEW (more fully described below) comprises a user interface which allows a loan originator to conduct all of the prepayment calculations, model analysis, and pricing of the present invention using the prepayment model first noted above.

The CEW operates in either a Unix or Windows NT environment using Oracle, SQL server, Sybase, DB2, or Informix database support. The CEW also uses CORBA or, structured object models together with a JAVA/HTML browser based graphical user interface.

The subroutines of the CEW all contribute to the end goal of determining the prepayment propensity of a consumer. For example, subroutines of the present invention deal supports the generation of various interest rate scenarios, and subsequent economic scenarios model fitting processes that fit the modeled interest rates scenarios to historical and current interest rate yield curve performance as well as to other macro economic indicators.

Part of the system includes rewards pricing logic to efficiently measure and price the impact of rewards on consumer prepayment behavior. For example it would be most beneficial to a lender to reward the consumer for not prepaying the lender's loan. Such a reward could be assessed in terms of its impact on the consumer prepayment behavior. The system therefore permits the end-user to design pro forma rewards structures and to test their impact on prospective consumer prepayment behavior.

Various user definable screens also establish default spreads, prepayment spreads, broker commission schedules, and other financial factors that influence the pricing of the product to be offered to the consumer. Various other economic scenarios are collected via the user interface and combined with various probabilities and default data as well as other lender defined criteria result in rationally priced end-user mortgage contracts.

Figure 3:
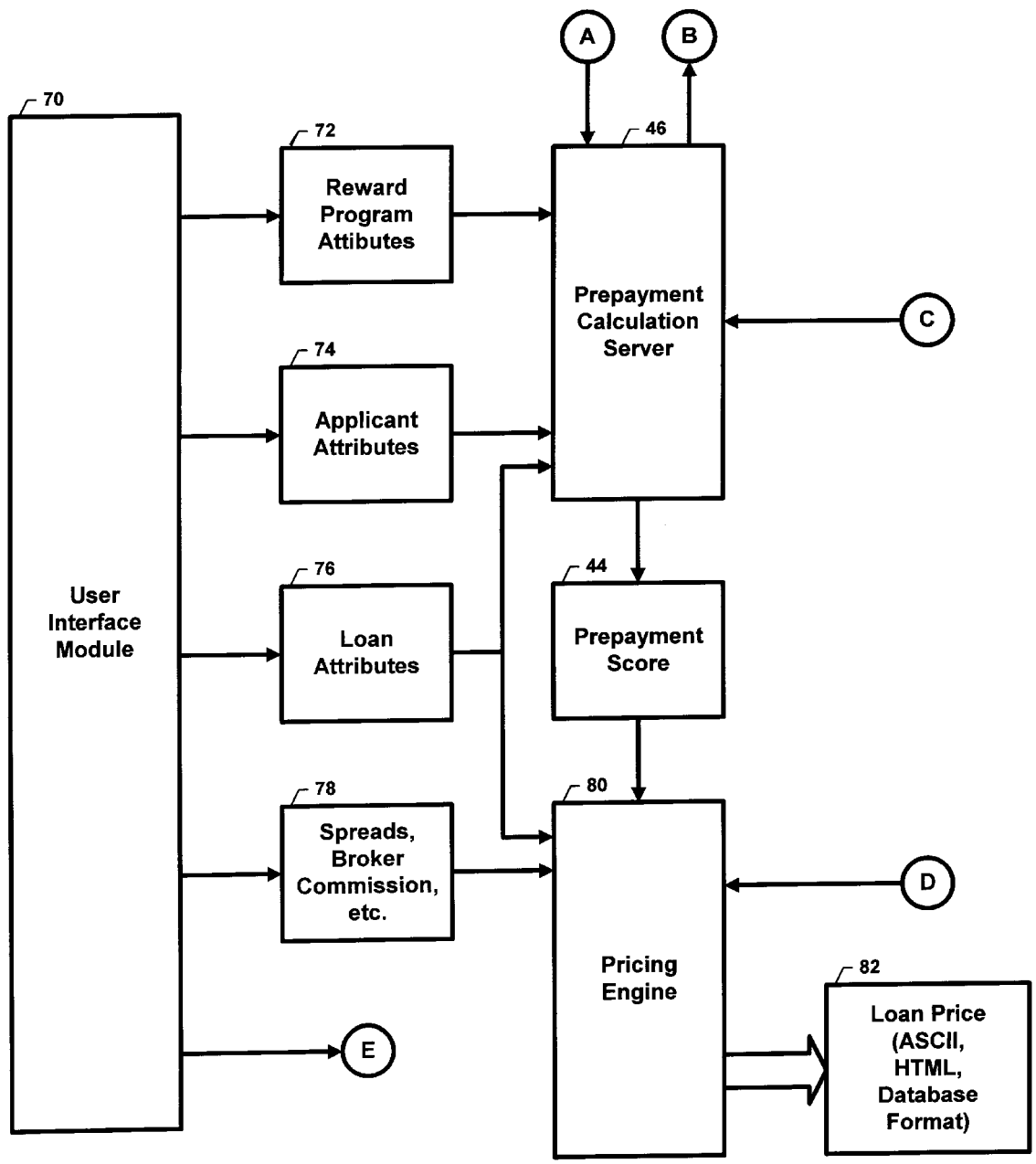
FIG. 3 is a block diagram showing the user interface module connections.

Referring to FIG. 3, further information concerning the CEW of the present invention shown. The system comprises user interface module 70 which is the basic graphical user interface and other software that allows an originator to provide information concerning a consumer who wishes to borrow money from lender. The user interface module allows the collection of loan attributes 76, applicant attributes 74, and reward program attributes 72. In addition user interface module 70 collects or calculates spreads, broker commissions and other costs associated with the loan 78. Loan attributes 76 and other loan related costs are fed into pricing engine 84 which, with other information, assists in creating an appropriate loan price 86.

Loan attributes 76, applicant attributes 74, and reward program attributes 72 all which have an impact on the value of the loan are fed into prepayment calculation server 80. Prepayment calculation server 80 receives input from the various prepayment model parameters and creates prepayment score 82.

Figure 4:
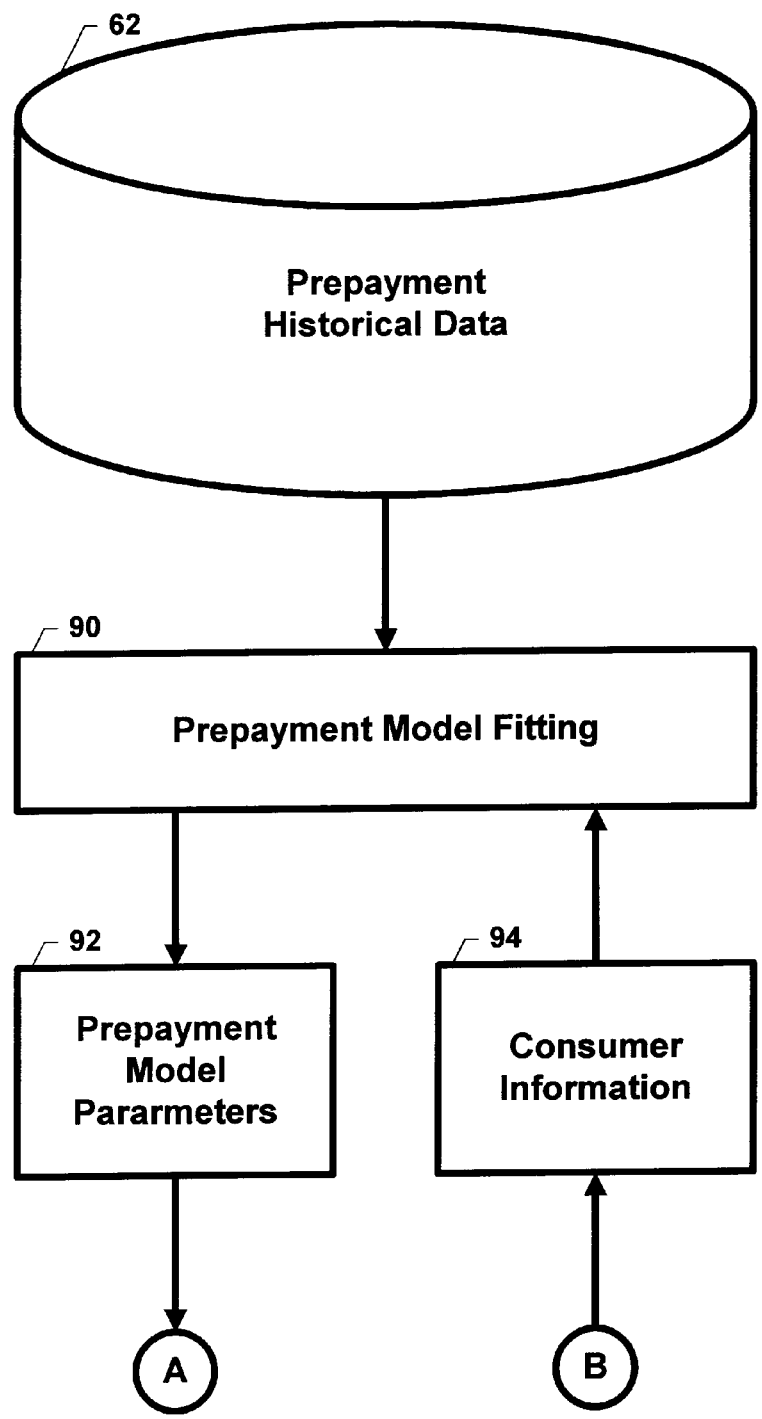
FIG. 4 is block diagram showing the interactions with the prepayment historical data.

Referring to FIG. 4, a block diagram showing the interactions which are necessary to create a prepayment model are shown. Consumer information 96 which consists of applicant attributes 74 and loan attributes 76 are fed into a prepayment model fitting 92 module. Prepayment model fitting 92 establishes various prepayment model parameters 94 based upon prepayment historical data 90. Once the appropriate prepayment model is created by prepayment model fitting 92, a model is returned to the prepayment calculation server for the calculation of the prepayment score of the particular consumer given the type of loan to consumer is requesting. The prepayment calculation server also benefits from input from an econometric model scenario generator.

Figure 5:
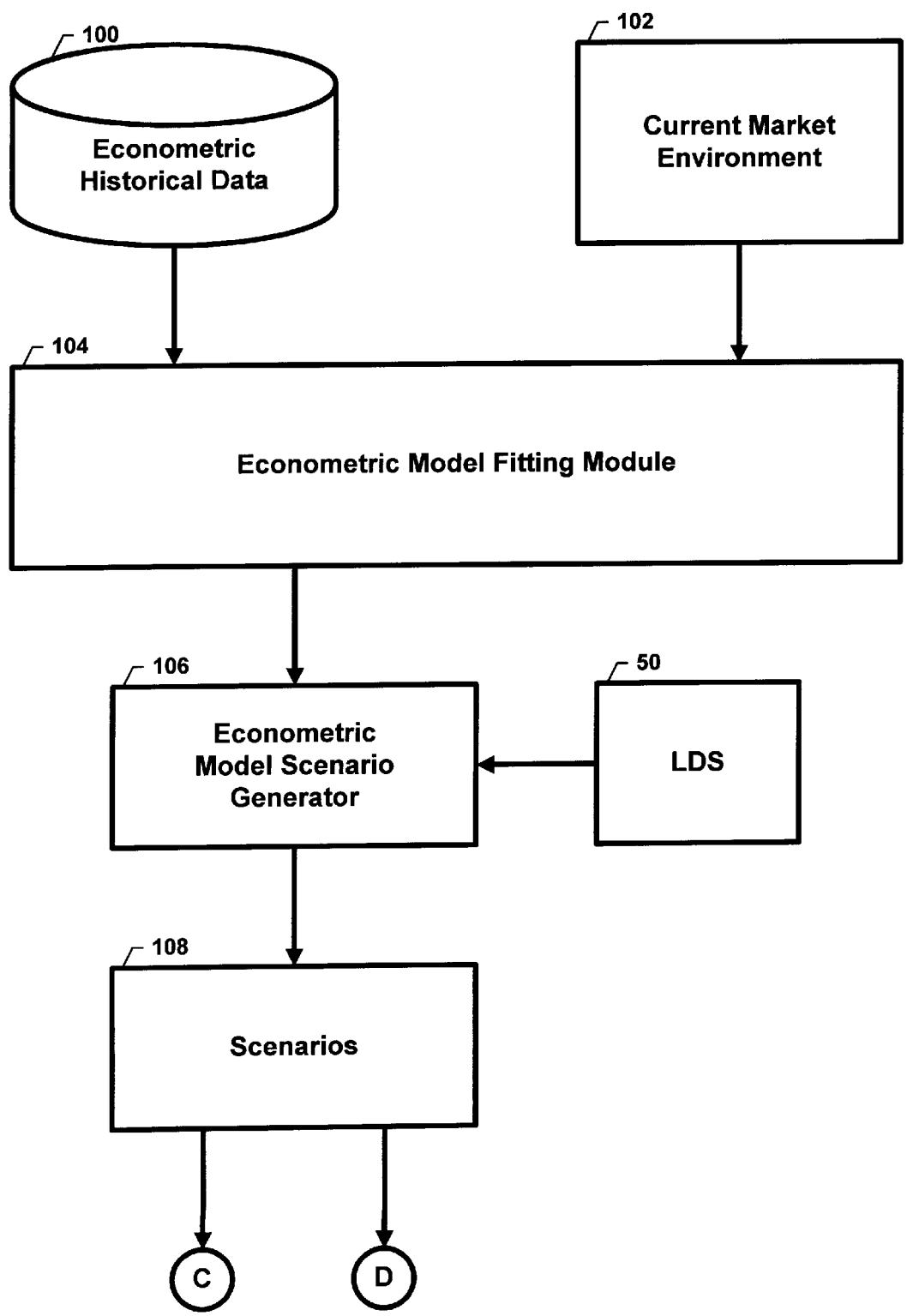
FIG. 5 is a block diagram showing the interactions with the econometric model.

Referring to FIG. 5, the interactions for the econometric model are shown. Econometric model scenario generator 106 receives input from econometric model fitting module 104 and LDS scenarios 108. Econometric model fitting module 104 receives information from econometric historical data 100 and current market environment 102 which comprises, without limitation, information concerning rising or falling interest rates and trends. The information from econometric historical data 100 concerns the demographic group to which the consumer belongs and other econometric information such as age, income, credit rating, occupation and other factors. The information from current market environment 102 concerns the direction and velocity of changes to interest rates. Econometric model scenario generator 106 processes the information and produces various scenarios based on the information.

Referring again to FIG. 3, prepayment calculation server 80 creates prepayment score 44 for the particular consumer in question. Prepayment score 44 is based upon the established prepayment model and the generated econometric model. Prepayment score 44 is transmitted to the pricing engine 82 to establish the pricing of the loan product to be offered to the consumer in question.

Figure 6:
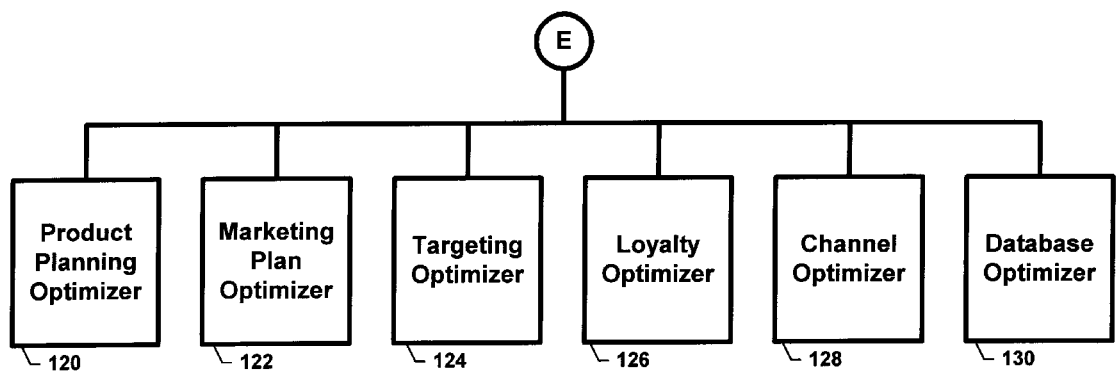
FIG. 6 is a block diagram showing the factors that are used by the user interface module.

Referring to FIG. 6, additional parameters which the user interface module uses to create the various scenarios are shown. Additional aspects of the present invention provide for creation of new products. Strategy optimizer 122 is based upon acceptance of offered products by consumers and input from and relating to other products are on the market. Strategy optimizer 122 generates marketing plans based upon individual lenders' portfolios. Such a market plan could assist the lender in offering new products to the marketplace that are more profitable for the lender. The system includes targeting optimizer 124 which provides a way to offer loan products to those consumers having the most favorable prepayment characteristics, i.e., a low propensity to prepay loans made. The system also comprises loyalty optimizer 126 which models and defines offers and other inducements to consumers to reward financially advantageous consumer behavior. Channel optimizer 128 is part of the present invention. Channel optimizer 128 analyzes the channels of delivery of financial product offerings to evaluate and determine the channel that is the most efficient way to deliver various financial products. The system also comprises database optimizer 130 which receives and organizes information in the various databases to constantly build and refined prepayment historical data 90 and econometric historical data 100.

The target platform on which the system of the present invention will run is either an Intel Pentium processor based system with typically 32 megabytes of RAM, hard disk storage and retrieval, and communications capability using the TCP/IP protocol. Alternatively the system will also run under the UNIX operating system on a Sun Solaris platform. In both cases displays for users are anticipated as is the ability to output hard copy reports. In typical operation, a plurality of users, remote from the system site will access the system via private networks or over the Internet to send the information necessary for the present invention to make the desired calculations leading to the prepayment score. This score is then sent back to the requesting user at the remote terminal.

A system and method for prepayment score generation has been described. Those skilled in the art will appreciate that other variations of the present invention are possible without departing from the scope of the invention as described.

We claim:

1. A system for determining prepayment scores representative of prepayment propensity of consumers for consumer mortgage loan originations, comprising:
   a plurality of loan origination terminals for accepting and transmitting consumer mortgage loan applications;
   a network connected to the plurality of loan origination terminals for receiving the transmitted consumer mortgage loan applications;
   a communication server connected to the network for receiving the transmitted consumer mortgage loan applications;
   an application parser connected to the communications server for receiving the transmitted consumer mortgage loan applications from the communications server and parsing the information into loan information and applicant information;
   a prepayment model library database comprising loan prepayment models connected to the application parser for receiving the loan information and fitting the loan information into the loan prepayment models and for transmitting loan prepayment models that match the loan information; and
   a prepayment calculation server comprising a prepayment score generation model connected to the prepayment model library database for receiving the loan prepayment models and calculating prepayment scores for each consumer mortgage loan application based upon the loan prepayment model and the prepayment score generation model, the prepayment calculation server is further adapted to transmit the prepayment scores to any one of the plurality of loan origination terminals via the communications server and the network;
   where the prepayment score is calculated from the formula:

$$\text{Score} = \sum_T TP(T)$$

where T represents time and P represents prepayment; and
   wherein the plurality of loan origination terminals are adapted to use the prepayment scores to adjust terms of the consumer mortgage loans.

2. The system for determining prepayment scores of claim 1, where the prepayment model library database further comprises:
   a model training server for creating the loan prepayment models for the prepayment model library database; and
   prepayment historical data connected to the model training server, the prepayment historical data further comprises prepayment statistics regarding loans of various types.

3. The system for determining prepayment scores of claim 1, where the prepayment calculation server further comprises an econometric model that generates Low Discrepancy Sequence (LDS)-based scenarios of econometric parameters for input to the prepayment calculation server.

4. The system for determining prepayment scores of claim 1, where total prepayment at time T is calculated from the formula:

$$P(T) = (1/S) \sum_{s=1}^{S} P_s(T)$$

where S represents the number of scenarios and P represents the prepayment amount for a given scenario.

5. The system for determining prepayment scores of claim 4, where the total prepayment, accumulated by time, in scenario s is calculated from the formula:

$$P_s(T) = \prod_i p_s(t_i)$$

where p(t) is a prepayment value.

6. The system for determining prepayment scores of claim 5, where the prepayment value in a given scenario is calculated from the formula:

$$p_s(t) = \Re(A, L, E_s(t))$$

where A is the applicant's data, L is the loan parameters, and $\Re$ is an analytical prepayment model.

7. A method for determining prepayment scores representative of prepayment propensity of loan applicants comprising:

collecting loan and applicant information at a loan originator;

transmitting the loan and applicant information over a network;

receiving the loan and applicant information at a service bureau;

the service bureau calculating a prepayment score for each applicant, where the prepayment score is calculated from the formula:

$$\text{Score} = \sum_T TP(T)$$

where T represents time and P represents prepayment;

the service bureau returning the prepayment scores over the network to the loan originator; and the loan originator using the prepayment scores to customize loan products for the applicants.

8. The method for determining prepayment scores of claim 7, where calculating a prepayment score for the applicant comprises a parser parsing the information into loan information and applicant information.

9. The method for determining prepayment scores of claim 8, further comprising providing the applicant information to a prepayment model library database and the loan information to a prepayment calculation server.

10. The method for determining prepayment scores of claim 9, further comprising the prepayment model library determining the prepayment model that best applies to the loan information and providing that prepayment model to the prepayment calculation server.

11. The method for determining prepayment scores of claim 10, further comprising the prepayment calculation server receiving a prepayment model and an econometric model, where the prepayment calculation server further calculates a prepayment score for the applicant.

12. The method for determining prepayment scores of claim 11, where the total prepayment at time T is calculated from the formula:

$$P(T) = (1/S) \sum_{s=1}^{S} P_s(T)$$

where S represents the number of scenarios and P represents the prepayment amount for a given scenario.

13. The method for determining prepayment scores of claim 12, where the total prepayment, accumulated by time, in scenario s is calculated from the formula:

$$P_s(T) = \prod_i p_s(t_i)$$

where p(t) is a prepayment value.

14. The method for determining prepayment scores of claim 13, where the prepayment value in a given scenario is calculated from the formula:

$$p_s(t) = \mathfrak{R}(A, L, E_s(t))$$

where A is the applicant's data, L is the loan parameters, and $\mathfrak{R}$ is an analytical prepayment model.

* * * * *